United States Patent [19]

Schröder et al.

[11] 4,102,845

[45] Jul. 25, 1978

[54] SPREAD-COATING COMPOSITIONS FOR PAPER COMPRISING AN AQUEOUS DISPERSION OF STYRENE/BUTADIENE POLYMER AND POLYETHYLENE OXIDE

[75] Inventors: Georg Schröder; Edgar Brehmer, both of Marl, Fed. Rep. of Germany

[73] Assignee: Chemische Werke Huels Aktiengesellschaft, Marl, Fed. Rep. of Germany

[21] Appl. No.: 792,624

[22] Filed: May 2, 1977

Related U.S. Application Data

[63] Continuation of Ser. No. 610,768, Sep. 5, 1975, abandoned.

[30] Foreign Application Priority Data

Sep. 6, 1974 [DE] Fed. Rep. of Germany ....... 2442704

[51] Int. Cl.$^{2}$ .......... C08L 9/08

[52] U.S. Cl. .......... 260/29.7 NR; 260/29.7 H; 260/29.7 E

[58] Field of Search .......... 260/29.7 NR, 29.7 H, 260/29.7 E

[56] References Cited

U.S. PATENT DOCUMENTS

| | | | |
|---|---|---|---|
| 3,117,942 | 1/1964 | Kingston et al. | 260/29.7 NR |
| 3,865,772 | 2/1975 | Hulyalkar | 260/29.7 H |

FOREIGN PATENT DOCUMENTS

| | | | |
|---|---|---|---|
| 873,876 | 8/1961 | United Kingdom | 260/29.7 NR |
| 939,151 | 10/1963 | United Kingdom | 260/29.7 NR |

*Primary Examiner*—M. J. Welsh
*Attorney, Agent, or Firm*—Millen & White

[57] ABSTRACT

Spread-coating compositions for improving the surface properties of paper comprising an aqueous dispersion of a styrene/butadiene-polymer, and from about 2% to about 30% by weight of total polymeric solids of polyethylene oxides of a molecular weight of from about 6,000 to about 50,000.

6 Claims, No Drawings

SPREAD-COATING COMPOSITIONS FOR PAPER COMPRISING AN AQUEOUS DISPERSION OF STYRENE/BUTADIENE POLYMER AND POLYETHYLENE OXIDE

This is a continuation, or application Ser. No. 610,768 filed Sept. 5, 1975 now abandoned.

BACKGROUND OF THE INVENTION

This invention relates to spread-coating compositions for improving the surface properties of paper, which comprises an aqueous dispersion of a styrene/butadiene-polymer as a synthetic binder, polyethylene oxides, pigments, optical brighteners, fillers and other customary auxiliary agents.

Paper spread-coating agents are utilized in technical applications to improve the surface properties of paper. The binder used in these spread-coating compositions frequently has two components, viz., a synthetic emulsion polymer and a naturally-occurring binder, e.g., pearl starch, soybean protein, casein. The naturally-occurring binders employed have the disadvantages that they are often not readily available and are non-uniform in quality. Therefore, efforts have been made in the art to develop spread-coating compositions containing synthetic binders exclusively.

Paper spread-coating agents based on synthetic binders have a number of disadvantages. For example, addition of synthetic binders adversely affects the behavior of optical brighteners and the water retention properties of the resultant coatings.

It is an object of the present invention to provide an additive for paper spread-coating compositions which makes possible the production of satisfactory spread-coating compositions without requiring the use of naturally-occurring binders. It is a further object of this invention to produce overall properties as good as those obtained by using natural binders.

SUMMARY OF THE INVENTION

These objects are attained by using in spread-coating compositions based on a styrene/butadiene-latex as a synthetic binder, from about 2% to about 30% by weight of polyethylene oxides having a molecular weight of from about 6,000 to about 50,000, based on the sum of the solids content of the binder plus polyethylene oxide. As used hereinafter "polymeric solids" means the mixture of polymeric binder and polyethylene oxides.

DETAILED DISCUSSION

In a preferred embodiment, the polyethylene oxides are utilized in amount of from about 5% to about 20% by weight of the polymeric solids total content of the synthetic binder and polyethylene oxide. Especially preferred are polyethylene oxides having a molecular weight of 15,000 - 20,000. Commercially available products can be employed, e.g., POLYWACHS-types (Chemische Werke Huls AG), GANTANOL E6000 (General Aniline), CARBOWAX-types (Union Carbide).

The synthetic binder suitable for use in the compositions of this invention, which is usually employed in amounts by weight (solids) of the composition from about 2% to 30%, preferably 5% to 20%, is a conventional water dispersable styrene/butadiene copolymer, in a 70 : 30 to 50 : 50 ratio of styrene to butadiene, which optionally can be carboxylated, e.g., up to about 5 mol.

percent. Such synthetic binders are described in British Pat. No. 873 876, e.g. examplex 3 B and 3 C.

The spread-coating compositions of this invention contain the conventional pigments, fillers and additional binders which function to bind the pigments to the surface of the paper. The most commonly used pigments are kaolin, titanium dioxide, barium sulfate, satin white (calcium sulfoaluminate),chalk, talc. Pigment dispersants, defrothers and optical brighteners can be added to these compositions to produce the desired flow properties and/or optical characteristics.

It will be understood that the major solid constituent of the compositions of this invention is the pigment or filler, such as China clay. Generally, this pigment will comprise from about 97% to about 69%, preferably about 94% to about 79% by weight (solids) of the composition.

The water content of the compositions of this invention generally is about 30% by weight to about 70%, preferably about 40% to about 65% by weight thereof, so as to provide a composition of spreadable consistency.

The spread-coating compositions of this invention can by applied by an air brush, a roll-type coater, a doctor blade or by any other usually coating device. Papers manufactured using the composition of this invention applied by these methods can be utilized in intalgio, typography and offset printing processes, both in sheet and roll printing.

The paper coatings produced using the spread-coating compositions of this invention have excellent water retention properties. Furthermore, the coatings have a very white appearance and substantially better gloss than spread-coated papers obtained from spread-coating agents containing no polyethylene oxides. Although polyethylene oxides are hydrophilic, a surprising aspect of the synthetic binder-polyethylene oxides combination of this invention is the fact that papers coated therewith have substantially unimpaired water resistance, even when up to 20% of the binder is replaced by polyethylene oxides. Equally unexpected is the fact that the adhesive strength of the coatings is substantially unchanged.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

A commercially-available binder (LITEX ® BL 786 of Chemische Werke Huls AG) based on a carboxylated styrene/butadiene copolymer (ratio of styrene/butadiene: 70/30; carboxylic acid content: about 1%) was used for all experiments. The most important properties of this binder are set forth below in Table I and compared to a binder : polyethylene oxide (molecular weight: 20,000) mixture in a weight ratio of 85 : 15.

TABLE I

| | Binder | Binder + Polyethylene Oxide |
|---|---|---|
| Solids Content (%) | 50 | 50 |
| pH Value | 6.4 | 6.3 |
| Surface Tension (dyne/cm$^{-1}$) | 46.8 | 46.7 |
| Particle Distribution, (Turbidity in % of a | 14.0 | 10.0 |

TABLE I-continued

| | Binder | Binder + Polyethylene Oxide |
|---|---|---|
| 0.0125% Dispersion) Viscosity (cPs at D = 78 $sec^{-1}$ — Agitation Time 1 Hour) | 200 | 300 |

This binder was used to prepare a paper spread-coating composition as follows:

| | Parts by Weight |
|---|---|
| "Euroclay K" (Amberger Kaolin Werke GmbH) | 100.00 |
| Binder (Solids) | 14.00 |
| "Sterocoll D" (BASF) | 0.90 |
| "Calgon PTH" (Benckiser Knapsack GmbH) | 0.20 |
| "Polysalz" (BASF) | 0.15 |
| "Blancophor PSR" (BAYER) | 0.20 |

The spread-coating composition thus produced has the following properties:

TABLE II

| Sample | 1 | 2 | 3 | 4 | 5 |
|---|---|---|---|---|---|
| Binder/Polyethylene Oxide (Mol.Wt.12,000) Weight Ratio | 100/0 | 95/5 | 90/10 | — | — |
| Binder/Polyethylene Oxide (Mol.Wt.20,000) Weight Ratio | — | — | — | 95/5 | 90/10 |
| Viscosity (cPs at D = 78 $sec^{-1}$ — Agitation Time: 1 Hour | 646 | 547 | 491 | 526 | 494 |
| pH Value | 7.8 | 7.9 | 7.8 | 7.8 | 7.8 |
| Solids Content (%) | 55.7 | 55.7 | 55.7 | 55.7 | 55.7 |
| Water Retention (sec.) | 37 | 46 | 57 | 51 | 59 |

Spread-coating compositions corresponding to Samples 1-5 were applied at a level of 12 g./$m^2$ to uncoated paper having the following properties:

| | |
|---|---|
| Gross Weight | 58 g./$m^2$ |
| Ash Content | 18% |
| Cobb Test | 60 g./$m^2$ |

The following testing methods were employed in evaluating the properties of the coated paper:

Pick Test Resistance: Determination was made by Tappi-Standard T 499 with the IGT Apparatus Type AC2 and at a compressive stress of 35 kg./$cm^2$.

K+N Test: Determination of the paint absorption of spread-coated papers according to Tappi Routine Control Method RC 19 was measured with a photoelectric remission photometer ELREPHO (filter R 457) from the firm Carl Zeiss.

Degree of Whiteness: The measurement was conducted with a photoelectric remission photometer ELREPHO (R 457 filter).

Wet Abrasion: Determination was done according to "Wochenblatt fuer Papierfabrikation" 15. 618 (1971). The duration of the test was one minute.

Gloss: The determination was conducted using a goniophotometer GP2 from the firm of Carl Zeiss, set at an angle of reflection of 45°. The samples had an area of 15 × 3 cm. The reported value was the result of an average of six individual measurements. Aperture diaphragm 0.5.

Water Retention Capability: The penetration time of the spread-coating composition through a standard paper (acidwashed special paper from the firm of Schleicher and Schull) was measured between two electrodes through a rise in amperage to 1 milliampere.

Cobb Test: The water absorption of a paper sample of 100 $cm^2$ area was measured during a test of one minute duration.

The coating was applied in a spread-coating pilot plant with a trailing-blade coater at a speed of 100 m./min. The spread-coating composition thus-applied was dried to a residual moisture of 8% and then satinized with a line pressure of 100 kp./cm. by passage through a three-roll calender. After conditioning at 55% relative atmospheric humidity and 23° C. for balance of humidity, the papers were tested. The results are given in Table III.

TABLE III

| Sample | 1 | 2 | 3 | 4 | 5 |
|---|---|---|---|---|---|
| Pick Test Resistance* (cm./sec.) | 100 | 100 | 100 | 100 | 90 |
| Cobb Test (g./$m^2$) | 56 | 56 | 55 | 56 | 55 |
| K+N Test (Loss in Degrees of Whiteness in % after 30"/60") | 27/ 30 | 31/ 34 | 30/ 34 | 31/ 33 | 29/ 31 |
| Degree of Whiteness | 79.2 | 81.2 | 81.8 | 81.6 | 82.2 |
| Wet Abrasion (% Turbidity) | 40 | 42 | 43 | 40 | 41 |
| Gloss | 31 | 29 | 32 | 36 | 38 |

*IGT Pick Test Oil L, printing speed rising to 2 m./sec.

EXAMPLE 2

Using the same binder as in Example 1, the following paper spread-coating compositions were produced (amounts are in parts by weight):

| Sample | 6 | 7 | 8 |
|---|---|---|---|
| "Euroclay K" | 100 | 100 | 100 |
| Binder (Solid) (LITEX BL 786) | 9.9 | 8.8 | 7.7 |
| Polyethylene Oxide (Mol.Wt. 20,000) | 1.1 | 2.2 | 3.3 |
| "Sterocoll D" | 0.3 | 0.3 | 0.3 |
| "Blancophor P" | 1.7 | 1.7 | 1.7 |

Finished paper coated by the procedure of Example 1 has the properties given in Table IV:

TABLE IV

| Sample | 6 | 7 | 8 |
|---|---|---|---|
| Pick Test Resistance* (cm./sec.) | 25 | 25 | 25 |
| Cobb Test (g./$m^2$) | 53 | 56 | 54 |
| K+N Test (Loss in Degrees of Whiteness in % after 30"/60") | 25/29 | 29/32 | 29/33 |
| Degree of Whiteness | 85.0 | 86.6 | 86.9 |
| Wet Abrasion (% Turbidity) | 34 | 39 | 50 |
| Gloss | 32 | 38 | 39 |

*IGT Pick Test Oil N, printing speed rising to 1 m./sec.

EXAMPLE 3

Using the binder of Example 1, the following spread-coating compositions were prepared (amounts in parts by weight):

| Sample | 9 | A* |
|---|---|---|
| China Clay SPS | 100 | 100 |
| Binder (LITEX BL 786) | 11 | 11 |
| Casein | — | 3.3 |
| Polyethylene Oxide (Mol.Wt. 20,000) | 3.3 | — |
| "Sterocoll D" | 0.3 | 0.3 |
| "Blancophor P" | 1.7 | 1.7 |
| NaOH | 0.125 | 0.125 |
| "Calgon" | 0.2 | 0.2 |
| "Polysalz" | 0.15 | 0.15 |

*Standard

These spread-coating compositions have the following properties:

TABLE V

| Sample | 9 | A* |
|---|---|---|
| Solids Content (%) | 55 | 55 |
| pH Value | 8.2 | 9.3 |
| Water Retention (sec.) | 57 | 55 |
| Viscosity (mPas at $D = 78\ sec^{-1}$ — Agitation Time 1 Hour) | 948 | 4152 |

*Standard

Finished paper spread by the method described in Example 1 has the properties given in Table VI:

TABLE VI

| Sample | 9 | A** |
|---|---|---|
| Pick Test Resistance* (cm./sec.) | 25 | 25 |
| K+N Test (Loss in Degrees Whiteness in % after 120") | 38.5 | 39.1 |
| Degree of Whiteness | 80.8 | 80.6 |
| Wet Abrasion (% Turbidity) | 56 | 55 |
| Gloss | 67 | 66 |

*IGT Pick Test Oil N, printing speed rising to 0.5 m./sec.
**Standard

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a spread-coating composition adapted for coating paper to improve the surface characteristics thereof, comprising about 94% to about 79% by weight of pigment or filler, and binder, said binder consisting of an aqueous dispersion of a styrene/butadiene-polymer, the improvement wherein the coating composition contains from about 5% to about 20% by weight, calculated on the total polymeric solids of the coating composition, of polyethylene oxides of a molecular weight of from about 6,000 to about 50,000.

2. The spread-coating composition of claim 1, wherein the polyethylene oxides have a molecular weight from about 15,000 to about 20,000.

3. The spread-coating composition of claim 1, wherein the synthetic binder is a butadiene-styrene copolymer in which the ratio of styrene to butadiene is from 70 : 30 to 50 : 50 .

4. The spread-coating composition of claim 3 wherein the synthetic binder is a carboxylated butadiene-styrene copolymer.

5. The spread-coating composition of claim 1 wherein the water content thereof is from about 30% to about 70% by weight.

6. The spread-coating composition of claim 2 containing as binder about 5% to about 20% by weight (solids) of the composition of a butadiene-styrene copolymer in which the ratio of styrene to butadiene is from 70 : 30 to 50 : 50 and about 40% to about 65% by weight of water.

* * * * *